No. 783,566. PATENTED FEB. 28, 1905.
A. P. BARLOW.
BED PAN.
APPLICATION FILED SEPT. 6, 1904.

Witnesses:
H. S. Gaither
Mary Kiddie

Inventor:
Ashbel P. Barlow
by Wm. J. Belt
Attorney

No. 783,566. Patented February 28, 1905.

UNITED STATES PATENT OFFICE.

ASHBEL P. BARLOW, OF ST. JOSEPH, MICHIGAN.

BED-PAN.

SPECIFICATION forming part of Letters Patent No. 783,566, dated February 28, 1905.

Application filed September 6, 1904. Serial No. 223,452.

*To all whom it may concern:*

Be it known that I, ASHBEL P. BARLOW, a citizen of the United States, residing at St. Joseph, in the county of Berrien and State of Michigan, have invented new and useful Improvements in Bed-Pans, of which the following is a specification.

The object of this invention is to provide a bed-pan of simple and inexpensive construction which is especially adapted for use in giving enemata and which can be readily applied and easily cleaned and kept in sanitary condition.

Figure 1:
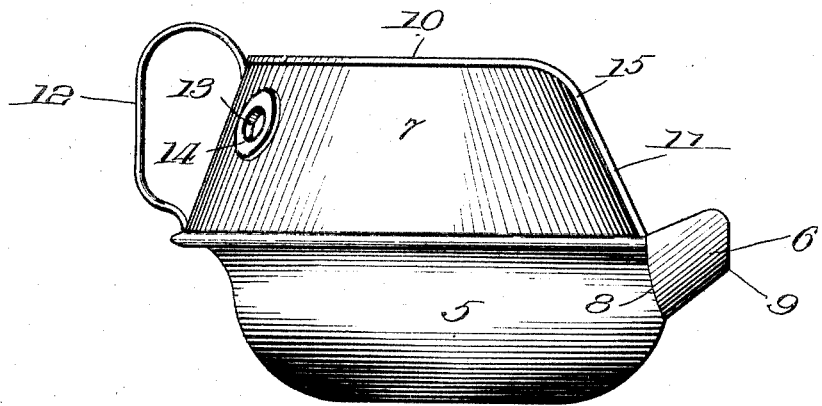
Figure 2:
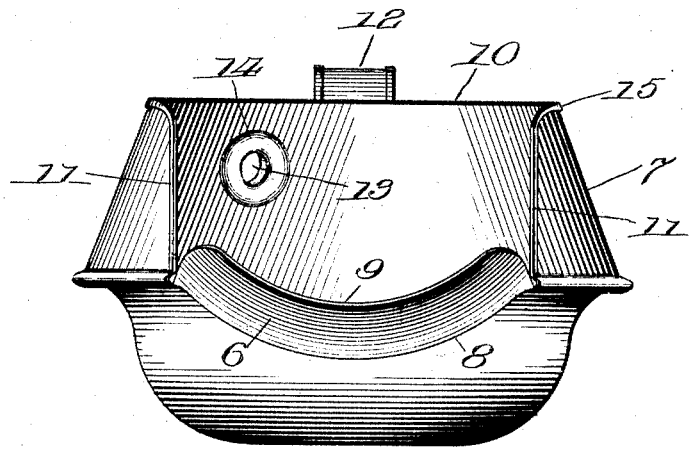

In the accompanying drawings, Figure 1 is a side elevation. Fig. 2 is a front elevation.

The bed-pan comprises a bowl-shaped bottom 5, provided at the front with an upwardly-extending lip 6 and having an inwardly-projecting flange 7 extending around the upper edge of the bottom from one end of the lip to the other. The bottom may be formed by pressing or molding the material of which the pan is made into the required shape, and it is preferably cut out at its front, as indicated by the line 8, and to the edge of this cut-out portion the lip is connected. The lip is curved to correspond substantially to the curvature of the cut-out portion, as indicated by the line 8, and it extends outwardly and upwardly, as shown, and has its front edge 9 curved substantially parallel with the edge of the cut-out portion of the bottom, as indicated by line 8. The flange 7, forming the upper portion of the pan, is connected to the upper edge of the bowl by seaming or otherwise and is bent inwardly and upwardly in converging lines, so that the diameter of the opening at the upper edge 10 of the pan is preferably considerably less than the diameter of the pan at the juncture of the flange with the bottom. The flange extends to each end of the lip, and its front edges 11 are inclined rearwardly, as clearly shown in Fig. 1. I provide the pan with a handle 12, and in the flange 7 I provide an opening 13, protected by a thimble 14, to receive the discharge-pipe of a syringe.

My improved bed-pan can be made of metal in parts and the parts joined together and made water-tight by seaming or soldering, or the pan can be molded in one piece, if desired. Around the upper edge of the flange 7 I provide a bead 15 to make a smooth edge, and this bead can also be provided on the outer edge of the lip, if desired.

My improved bed-pan is simple and inexpensive in construction and is adapted to be readily applied. It can be made of large capacity and is therefore especially adapted for giving enemata, and in this connection the protected opening 13 permits the application of a syringe and the pan at the same time while the pan is in position for effectively accomplishing its object.

Without limiting myself to the exact construction and arrangement of parts herein shown and described, what I claim, and desire to secure by Letters Patent, is—

1. A bed-pan having a bowl-shaped bottom, and an upwardly and inwardly inclined flange connected to the edge of the bottom, said flange being divided and its ends separated to form an opening at the front of the pan, and the edges of said ends being inclined rearwardly.

2. A bed-pan having a bowl-shaped bottom, an upwardly-extending flange connected to the edge of the bottom, said flange being divided and its ends separated to form an opening at the front of the pan, and an upwardly-extending lip connected to the edge of the bottom between the ends of said flange.

3. A bed-pan having a bowl-shaped bottom, an upwardly and inwardly inclined flange connected to the edge of the bottom, said flange being divided and its ends separated to form an opening at the front of the pan, and an upwardly-extending lip connected to the edge of the bottom between the ends of said flange.

4. A bed-pan having a bowl-shaped bottom cut out at the front, an upwardly-extending lip connected to the edge of said cut-out portion of the bottom, and an upwardly-extending flange connected to the edge of the bottom and extending around the bottom from one end of the lip to the other.

ASHBEL P. BARLOW.

Witnesses:
 FRANK BRACELIN,
 B. J. KNIEBES.